United States Patent
Krigovski et al.

(10) Patent No.: US 10,146,696 B1
(45) Date of Patent: Dec. 4, 2018

(54) DATA STORAGE SYSTEM WITH CLUSTER VIRTUAL MEMORY ON NON-CACHE-COHERENT CLUSTER INTERCONNECT

(71) Applicant: EMC IP Holding Company LLC, Hopkinton, MA (US)

(72) Inventors: Louis Krigovski, Lexington, MA (US); David Reese, Westborough, MA (US); Clifford Lim, Hopkinton, MA (US); Steven T. McClure, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 15/283,173

(22) Filed: Sep. 30, 2016

(51) Int. Cl.
 *G06F 12/1009* (2016.01)
 *G06F 3/06* (2006.01)

(52) U.S. Cl.
 CPC ........ *G06F 12/1009* (2013.01); *G06F 3/0604* (2013.01); *G06F 3/064* (2013.01); *G06F 3/067* (2013.01); *G06F 3/0665* (2013.01); *G06F 2212/152* (2013.01); *G06F 2212/154* (2013.01); *G06F 2212/263* (2013.01); *G06F 2212/656* (2013.01); *G06F 2212/657* (2013.01)

(58) Field of Classification Search
 None
 See application file for complete search history.

(56) References Cited

U.S. PATENT DOCUMENTS

| | | | | |
|---|---|---|---|---|
| 5,918,248 A * | 6/1999 | Newell | ............... | G06F 9/5016 711/147 |
| 5,974,508 A * | 10/1999 | Maheshwari | ......... | G06F 12/126 710/200 |
| 7,702,743 B1* | 4/2010 | Wong | ................. | G06F 12/0284 709/216 |
| 8,301,717 B2 | 10/2012 | Deshpande | | |
| 9,081,594 B1 | 7/2015 | Labonte et al. | | |
| 2004/0066758 A1* | 4/2004 | Van Doren | ......... | G06F 12/0828 370/329 |
| 2004/0068622 A1* | 4/2004 | Van Doren | ......... | G06F 12/0808 711/146 |
| 2004/0143712 A1* | 7/2004 | Armstrong | ............. | G06F 9/526 711/152 |
| 2013/0282994 A1 | 10/2013 | Wires et al. | | |

(Continued)

*Primary Examiner* — Sean D Rossiter
(74) *Attorney, Agent, or Firm* — BainwoodHuang

(57) ABSTRACT

A data storage system includes compute engines each including a CPU complex, physical memory, interfaces to host computers and physical storage devices, and a fabric interface. A non-cache-coherent fabric interconnects the compute engines as cluster members of a cluster, the fabric supporting a global lock enabling each cluster member to obtain temporary exclusive access to addressable units of non-virtual memory. The CPU complexes implement a global virtual memory (GVM) on top of the non-virtual memory, including (1) a globally shared GVM page table of global page table entries, each identifying the cluster members having a corresponding GVM page mapped, and (2) GVM page management functionality including (i) use of the global lock to obtain exclusive access to the global page table entries for page management operations, and (ii) transfer of underlying data of the pages of the GVM among the cluster members.

17 Claims, 4 Drawing Sheets

(56) References Cited

U.S. PATENT DOCUMENTS

| | | | |
|---|---|---|---|
| 2014/0337457 A1* | 11/2014 | Nowoczynski | G06F 15/17331 709/212 |
| 2015/0039793 A1* | 2/2015 | Rossetti | H04L 49/90 710/105 |
| 2015/0178206 A1* | 6/2015 | Chamberlain | G06F 12/0817 711/122 |
| 2015/0317183 A1* | 11/2015 | Little | G06F 17/30362 707/703 |
| 2016/0188470 A1* | 6/2016 | Kruckemyer | G06F 12/0828 711/146 |
| 2017/0228164 A1* | 8/2017 | Jayasena | G06F 3/067 |
| 2017/0249098 A1* | 8/2017 | Petkov | G06F 12/1009 |
| 2018/0074960 A1* | 3/2018 | Raz | G06F 12/0831 |
| 2018/0173643 A1* | 6/2018 | Yu | G06F 3/0622 |

* cited by examiner

US 10,146,696 B1

DATA STORAGE SYSTEM WITH CLUSTER VIRTUAL MEMORY ON NON-CACHE-COHERENT CLUSTER INTERCONNECT

BACKGROUND

The invention is related to the field of data storage systems, and in particular to data storage systems employing multiprocessing.

SUMMARY

In data storage systems employing multiprocessing, there is a need for globally accessible memory, i.e., memory whose contents are at least visible to (and may also be manipulated by) some or all processing nodes. It may be necessary, for example, for many/all nodes to have access to metadata describing structures used throughout the system, where such metadata is preferably memory-resident for performance reasons.

The present disclosure is directed to a memory sharing arrangement referred to as "global virtual memory" or GVM. Being virtual, it resides very close to the CPU and enjoys available hardware support for processor virtual memory. But it is also globally defined and accessible throughout the system, supporting system needs such as global visibility of metadata.

The following are important aspects of the disclosed technique:
1) A cluster of compute complexes each with hardware support for paging and virtual memory
2) Units of shared data divided into a set of common page sizes as defined by the hardware.
3) A common logical address space configured on all cluster members to define the range of GVM.
4) A non-cache coherent interconnect fabric interconnecting the cluster members for:
   a. Transport of pages between the systems.
   b. A shared structure to maintain information about the GVM pages.
   c. Per-page (GVM) global locks.
5) Persistent storage for GVM page swapping.

More specifically, a data storage system is disclosed that includes a plurality of compute engines each including a CPU complex, physical memory, front-end interfaces to host computers as initiators of storage I/O operations, back-end interfaces to physical storage devices, and a fabric interface. A non-cache-coherent fabric interconnect is connected to the respective fabric interfaces of the compute engines to functionally interconnect the compute engines as cluster members of a cluster, the fabric interconnect supporting a global lock enabling each of the cluster members to obtain temporary exclusive access to addressable units of non-virtual memory. At least one cluster member has access to persistent storage for memory page swapping.

The CPU complexes collectively implement a global virtual memory on top of the non-virtual memory, including (1) a globally shared GVM page table of global page table entries, each identifying the cluster members having a corresponding virtual page mapped, and (2) GVM page management functionality including (i) use of the global lock to obtain exclusive access to the global page table entries for page management operations, and (ii) transfer of underlying data of the pages of the global virtual memory among the cluster members.

The description below employs various specific facilities for an example implementation, including a specific type of fabric and the use of a technique called "global memory" which provides space for the shared structure (GVM page table), a global compare and swap for locks, and a transport layer which uses direct memory access (DMA) and global memory for efficiency. Other specific embodiments within the scope of the appended claims are contemplated.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
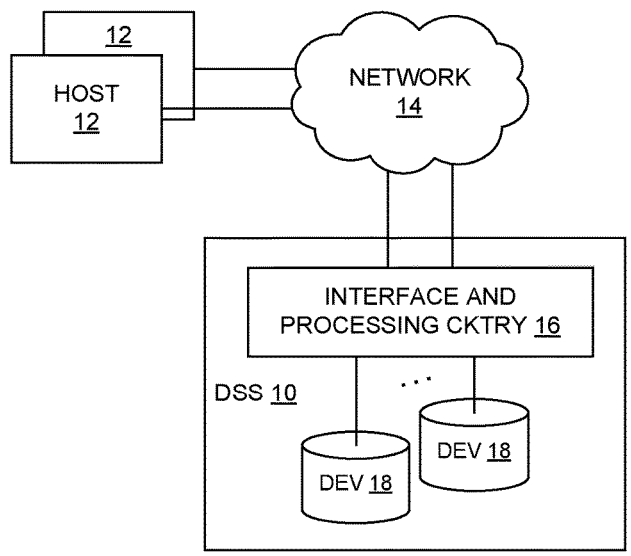
FIG. 1 is a block diagram of a data processing system.

FIG. 1 shows a data processing system including a data storage system (DSS) 10 connected to a set of host computers (HOST) 12 by a network 14. The data storage system 10 includes interface and processing circuitry 16 and secondary storage devices (DEV) 18 such as magnetic disk drives, Flash-based storage devices, etc.

The data storage system 10 provides data storage services to the clients 12 via the network 14. In some embodiments, the data storage system 10 may provide storage in the form of block-structured logical storage devices, also referred to as "LUNs" or "volumes", using the devices 18 for underlying real physical storage. In this case the data storage system 10 may use a suitable storage-oriented protocol on the network 14. The network 14 may be realized as a so-called storage area network or SAN and utilize a native block-oriented protocol such as FiberChannel. Alternatively, the network 14 may be a TCP/IP network having a block-oriented protocol (such as iSCSI) layered above the TCP/IP layer. In other embodiments, the data storage system 10 may provide so-called network attached storage or NAS, which may be traditional NAS (supporting a file system view and conventional file-system operations) or so-called transactional NAS (e.g., database, virtualized storage, etc.).

Figure 2:
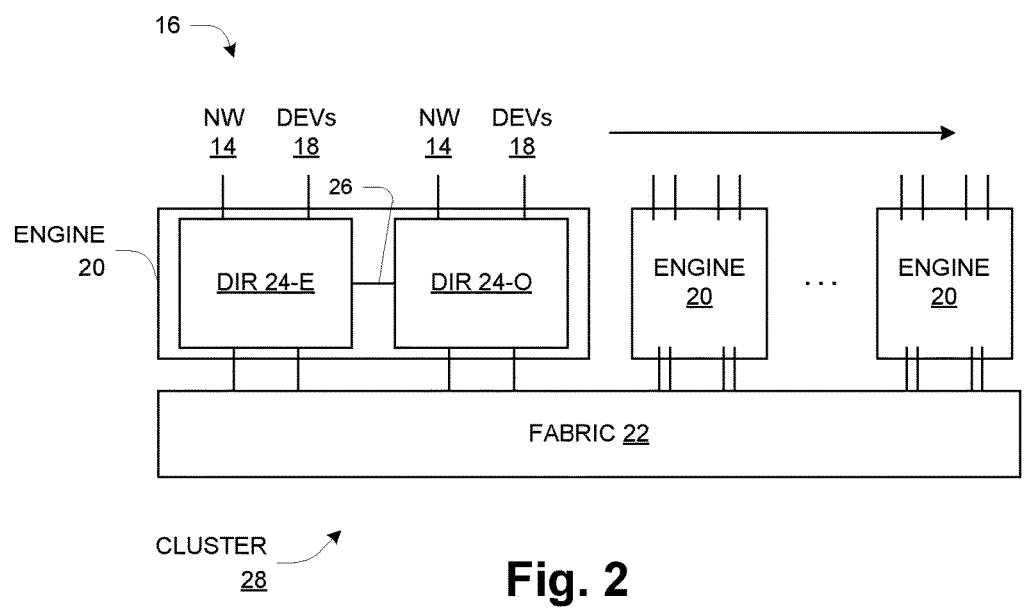
FIG. 2 is a block diagram of processing circuitry of a data storage system.

FIG. 2 shows structure of the interface and processing circuitry 16. It includes a set of compute engines 20 interconnected by a dense, high-speed interconnect referred to as a "fabric" 22. In the illustrated example each engine 20 includes two directors 24, one referred to as "even" and shown as 24-E, the other as "odd" and shown as 24-O. The directors 24 of an engine 20 are connected together by a high-speed common memory interconnect (CMI) 26. Each director 24 has connections to the network 14 and to the devices 18, as well as to the fabric 22. Due to its multiprocessing nature, this arrangement is also referred to as a "cluster" 28 herein, with each director 24 or engine 20 referred to as a cluster "member". Generally, a member is a closely-coupled compute complex, i.e., an arrangement of processors coherently sharing a primary memory. The fabric 22 provides a next level of functional coupling. In one embodiment the fabric 22 is realized using Infiniband interconnect, which supports inter-node data transfer using remote direct memory access (RDMA). Infiniband also provides messages for global-extent atomic operations, i.e., operations involving transitory and globally visible locking and unlocking of sections of memory, which are used in the manipulation of certain structures as described below. Other interconnect technologies may be employed. Other important aspects of the directors 24 and fabric 22 are described below.

Figure 3:
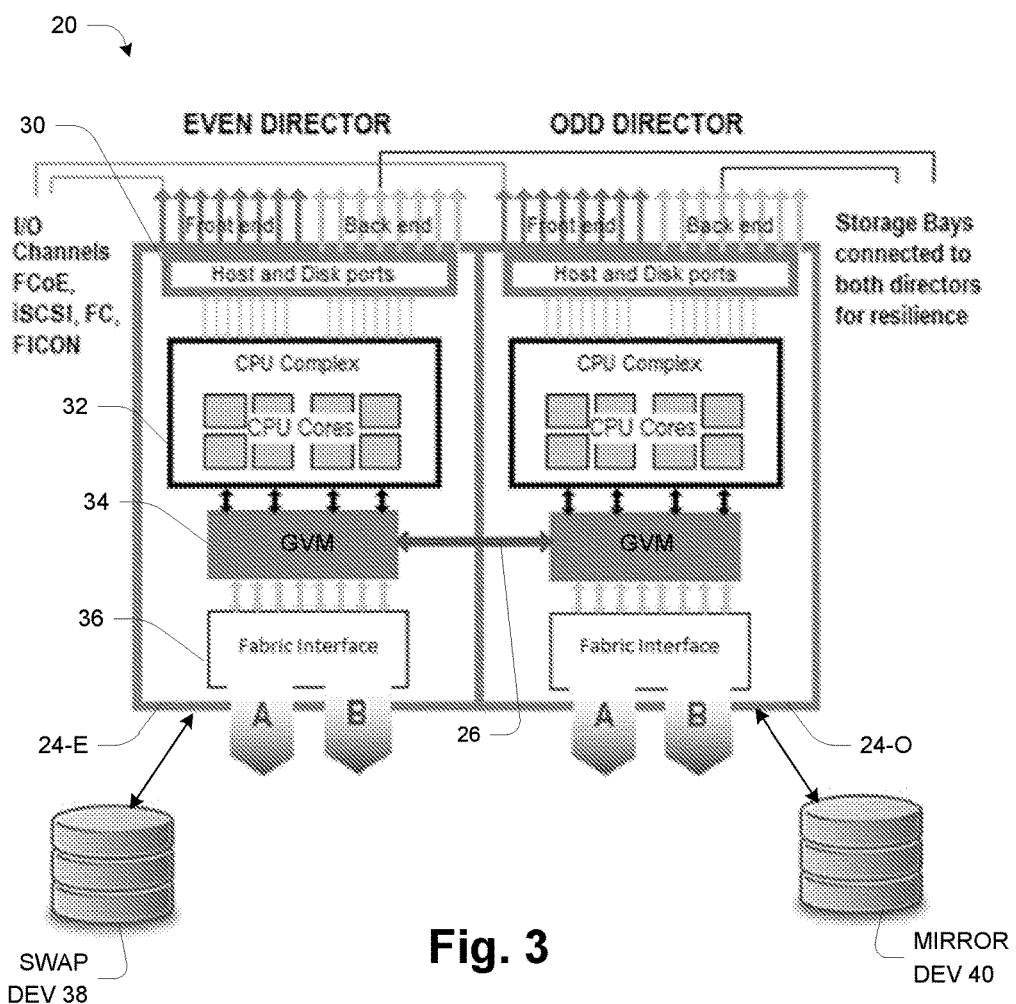
FIG. 3 is a block diagram of a compute engine.

FIG. 3 shows structure of an engine 20. In includes a set of ports 30 for connecting to the hosts 12 and devices 18. Connections to the hosts 12 are shown as "front end" connections to "I/O channels", and connections to the devices 18 are shown as "back end" connections to "storage bays". Note that both connection types are redundant, i.e., a given I/O channel is connected to both directors 24-E and 24-O, and a given storage bay is also connected to both directors 24-E and 24-O. Each director 24 also includes a set of processors or CPUs, shown as a CPU complex 32, a memory shown as global virtual memory (GVM) 34, and a fabric interface 36. The GVMs 34 of the directors 24-E, 24-O are interconnected by the CMI 26. The fabric interface 36 has redundant connections A, B to the fabric 22 (FIG. 2). Also shown in FIG. 3 are a swap device 38 and mirror device 40 with logical connections to the engine 20. The swap device 38 is used to store a primary copy of a swap file used by memory management, as explained more below, and the mirror device 40 to store a mirror copy of the swap file for redundancy.

The CPU complex 32 includes processors, memory, and I/O interface circuitry interconnected by data interconnections such as one or more high-speed data buses, where the I/O interface circuitry provides hardware connections to the ports 30 and fabric interface 36. In operation, the memory of the CPU complex 32 stores data and instructions of system software (e.g., operating system) and one or more application programs which are executed by the processor(s) to cause the data storage system 10 to function in a software-defined manner. Beyond the basic operations of writing/reading data to/from the devices 18 in response to storage I/O commands from the hosts 12, the storage system 10 may include any/all of a rich set of additional functionality including RAID, disk caching, remote mirroring, and various higher-level functions such as data deduplication, device encryption, etc. The present description is focused on the mechanics and use of GVM 34 in particular, which is a low-level operation used by operating software in many of the functions/processes performed within the CPU complexes 32 of the directors 24.

GVM 34 is a specialized form of virtual memory. Like conventional virtual memory, it is implemented as a logical structure on top of "real" (physical) memory as well as a swap device 38, and it is realized partly by operation of a hardware memory management unit (MMU) very closely connected with the CPU instruction execution unit (specifically, memory access instruction execution). This means that the GVM 34 appears as simply a region of primary memory to applications executing in the CPU complex 32—access is generally fast (assuming the underlying physical page is present) and requires no special programming. Unlike conventional virtual memory, the GVM 34 is globally shared by the compute engines 20 (cluster members) of the cluster 28, using a "non-cache-coherent" mechanism as explained below. In the illustrated embodiment, GVM 34 may also be mirrored between two engines 20, providing for resilience as well as ease of GVM-based inter-director communications and transfers.

GVM 34 may be used in a variety of ways, but in designing its use attention should be paid to potential performance issues. Programmatically, GVM 34 is very easy to use, but its use consumes real system resources, notably inter-engine bandwidth of the fabric 22 and corresponding latency, when GVM pages are actively shared by multiple directors 24. GVM 34 is tailored for use with data that may be read frequently, and by multiple readers, but modified relatively infrequently. The underlying physical pages can be copied to all the readers, and if modified infrequently they do not need to be flushed or re-loaded very often. For data that is modified frequently and/or by lot of different directors 24, performance will be poorer, because the underlying physical page(s) will be transferred often, using bandwidth and incurring latency. In the data storage system 10, GVM 34 can be used to store important metadata that must be visible to many/all directors 24, where the metadata describes the various logical devices (LUNs etc.) defined in the system, both host-visible and internal-only. Such metadata is generally of the first type, i.e., read frequently and by multiple readers, but modified relatively infrequently, and thus GVM 34 well supports the aspects of operation based on system metadata. A storage system may have hundreds or thousands of MB of such metadata.

Figure 4:
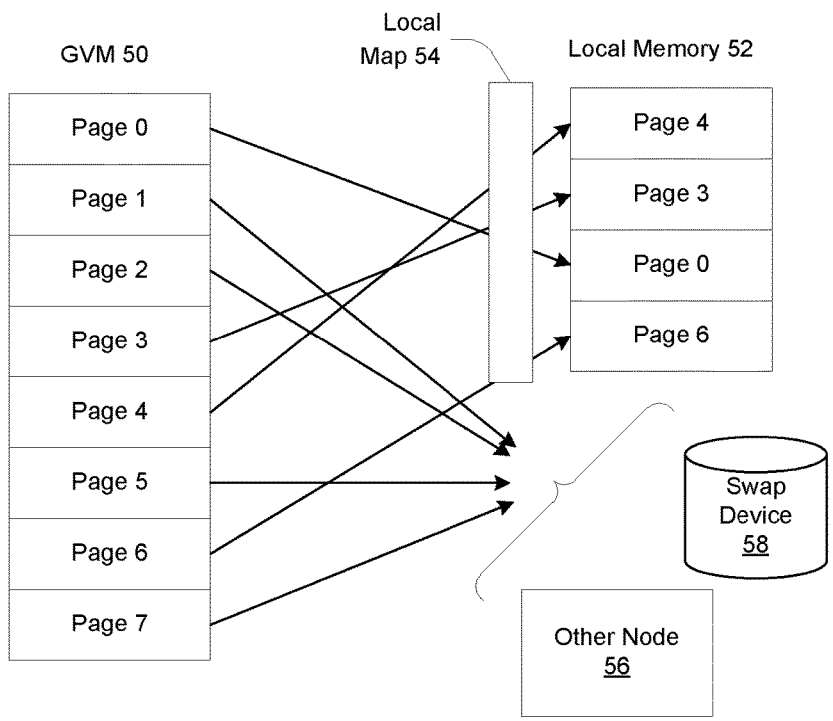
FIG. 4 is a schematic diagram illustrating global virtual memory.

FIG. 4 illustrates an aspect of GVM 34, namely "virtualness". As shown at left, a set 50 of GVM pages 0-7 appears as a linear array in a virtual address space, with no additional structure. In general, some pages 50 are mapped to local memory 52 via a mapping structure 54, and others are either mapped on a different node 56 or swapped out to a swap device 58, which may be accessible to this node or to another node. If the page is read-only it could be mapped at the same time on multiple nodes. In the illustrated example, pages 4, 3, 0 and 6 are locally mapped, and the remaining pages 7, 1, 2 and 5 are either mapped on another node or swapped out.

Figure 5:
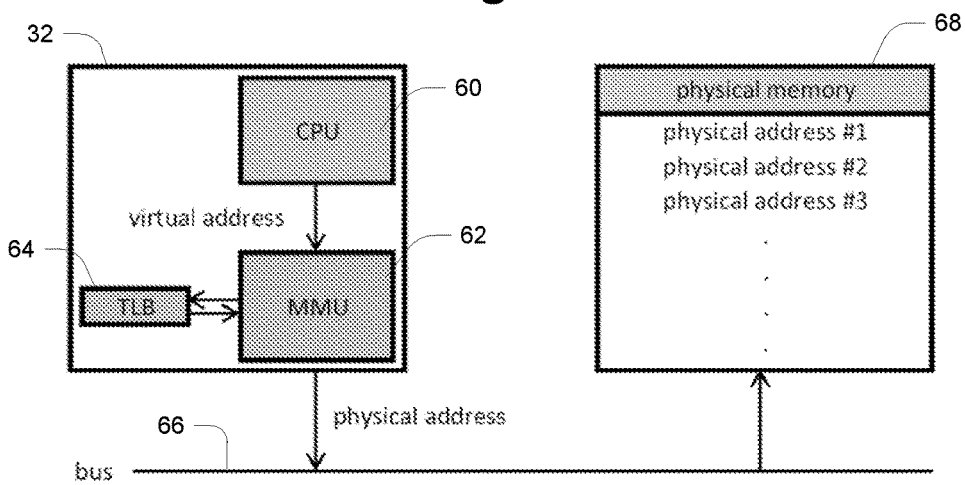
FIG. 5 is a simplified block diagram of a processing node including a memory management unit (MMU)

FIG. 5 shows certain hardware within a director 24. Within a CPU complex 32 is a CPU 60, a memory management unit (MMU) 62, and a translation lookaside buffer (TLB) 64. The MMU 62 is connected by a bus 66 to a physical memory 68. In operation, the CPU 60 generates virtual memory addresses (i.e., addresses in virtual memory space). The MMU 62 and TLB 64 are responsible for mapping these virtual addresses to physical memory addresses (addresses in physical memory space). In particular, the mapping is typically based on fixed-size "pages" as shown in FIG. 4, i.e., the mapping is of a virtual page number (higher-order virtual address bits identifying a virtual page) to a physical page number (higher-order physical address bits identifying a physical page).

Figure 6:
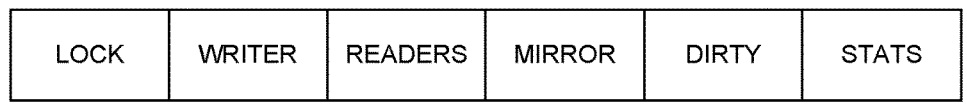
FIG. 6 is a schematic diagram of a GVM page table entry.

FIG. 6 illustrates the structure of GVM page table entries, also referred to as GPTEs, used in conducting GVM-related operations. Specifically, software code uses GPTEs when there is a page fault and when it needs to configure a regular page table entry that is used within the MMU 62. Note that there is a distinction between the GVM page table, which is essentially a software object, and the standard hardware page tables used by the MMU 62. An individual GPTE pertains to one corresponding virtual page, and the set of GPTEs is maintained in a structure referred to as a GVM page table. Each GVM page has a corresponding global, fixed-size (e.g., 32 bytes) GPTE stored in globally accessible physical memory, which may be provided using a technique referred to as "global memory" and explained briefly below. A GPTE can be manipulated across the fabric 22 using mask-compare, mask-swap (MCMS) atomic operations.

As shown in FIG. 6, a GPTE stores the following values:

Lock—identifies a director currently holding a lock on the GVM page

Writer—identifies a current director allowed to modify the GVM page

Readers—identifies all directors having read copies of the GVM page

Mirror—identifies the mirror status of the GVM page

Figure 7:
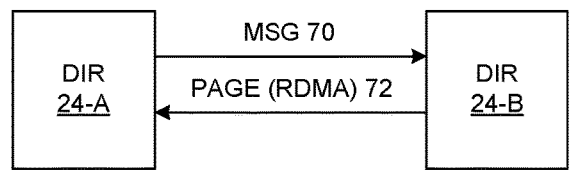
FIG. 7 is a schematic diagram illustrating GVM page transfer.

Dirty—identifies whether the GVM page is modified and not yet written to backing store Stats—statistics on use of GVM page FIG. 7 illustrates inter-director transfer of a GVM page, which occurs whenever a director 24 is accessing the page but does not currently have the underlying physical page in local memory. This situation may be referred to as a "page fault", although as mentioned above it is distinguished from the situation in which a page is merely swapped out rather than held by another director 24. In that case, the director 24 that needs the page obtains it from the swap device 38, using standard methods of accessing secondary storage. In the situation of FIG. 7, director 24-A needs the page and director 24-B has a copy (with either write access or read-only access). The director 24-A sends an explicit message (MSG) 70 to director 24-B requesting transfer of the page. If the director 24-A intends to modify the page, then the message indicates so, and the director 24-B will invalidate its local copy as part of the transfer. The transfer is accomplished by a remote DMA (RDMA) operation 72 from the director 24-B into the local memory of the director 24-A. Once the page transfer has occurred, the corresponding GPTE may be updated to reflect this activity, and the director 24-A can re-start the GVM access that caused the page fault operation to occur. With the page now locally resident, the GVM access will complete normally. The GPTE update generally requires use of a lock to manage potential contention, i.e., the GPTE is first locked, then modified, then unlocked. General lock functionality is explained below.

From the above description, there are three cases when handling page faults. The page being accessed may be only in a swap device or it may be mapped on another member, and if mapped on another member it may be either read mapped or write mapped. There may be other cases, such as page fault on a cluster member which has the swap device, or page fault caused by write into address which is mapped read-only, but such other cases may be derived from the three basic cases. Generally, the handling for GVM pages includes several fundamental concepts that are part of normal VM page fault handling. These concepts, including finding a free physical page to use, initializing a new page, and swap file management, will be familiar to anyone skilled in the art and are not included in this description. Note too, as shown in FIG. 4, that there is a separate area of local memory on every cluster member that is reserved exclusively for GVM pages and managed by the GVM page fault handler.

The following is a list-form summary of the three cases described above, identifying the two cluster members as X and Y.

Case 1—Page Fault on Page that is only in Swap Device:
1) CPU on X Performs Load/Store into unmapped address.
2) CPU takes Page Fault from MMU.
3) X acquires Global Lock on GPTE Entry.
4) X sends message to Y (having access to Swap device) that X needs page.
5) Y obtains page and RDMAs page to X.
6) X MMU maps page read-only.
7) X Updates GPTE state (reflecting who has page mapped and how).
8) X unlocks Global Lock on GPTE entry.

Case 2—Read Page fault on Page which is Read or Read/Write Mapped on another Cluster Member:
1) X performs Read from unmapped Address.
2) CPU takes Page Fault from MMU.
3) X acquires Global Lock on GPTE Entry.
4) X sends message to Y to unmap it and send it to X.
5) Y RDMAs page to X.
6) Y invalidates and removes page from its local MMU.
7) X MMU maps page read-only.
8) X updates GPTE state. (Reflecting who has it mapped and how)
9) X unlocks Global Lock on GPTE entry.

In this case if the page is read-only mapped on Y it is possible to just replicate the Page on X. Both X and Y can have it mapped as read-only at the same time. Such replication is a performance optimization. The GVM will function properly without such optimization.

Case 3—Write Page Fault on Page which is Read or Read/Write Mapped on Another Cluster Member:
1) X performs write into unmapped Address.
2) CPU takes Page Fault from MMU.
3) X acquires Global Lock on GPTE Entry.
4) X sends message to Y to unmap it and DMA it X.
5) Y RDMAs page to X.
6) Y invalidates and removes page from its local MMU.
7) X MMU Maps page Read/Write access.
8) X updates GPTE state. (Reflecting who has it mapped and how)
9) X unlocks Global Lock on GPTE entry.

Note in this case the GVM page cannot be mapped as Read/Write on both X and Y at the same time.

It will be appreciated that the above inter-director transfer mechanism is not a cache-coherent mechanism, i.e., it does not involve automatic coherency across all directors 24 based on simply communicating regular memory read/write operations on the inter-director interconnect. Rather, it requires messaging that explicitly signals transfer of a physical page from one director 24 to another. If a page is modified by a director 24, that modification is only made visible to other directors 24 when they explicitly obtain a copy of the modified page. In this sense, the fabric 22 can be characterized as "non-cache-coherent", i.e., lacking support for maintaining coherency of a shared page across the directors 24.

GVM implements paging at the CPU instruction level. This feature, along with the lock support provided by the fabric 22, means that CPU-level atomic operations work with respect to GVM. As an example, the following loop of pseudocode can run concurrently on all directors 24 of the data storage system 10. The variables global_spinlock and global_variable are visible and coherent across all directors 24.

SpinLock_t global_spinlock;
UINT32 global_variable;
for (i=1; i<1000; i++){
spinlock_take(&global_spinlock, dir_number_1+1);
global_variable=dir_number_1;
yield( );
if (global_variable !=dir_number_1)
    printf("Error!\n")
spinlock_release(&global_spinlock);

As mentioned, the GPTEs may be stored using a special memory access technique referred to as "global memory" or GM. GM is essentially emulated shared memory, i.e., it realizes memory sharing by using a GM function library, also referred to as an "API". In this realization, GM has a logical structure embodied in the API and known to all the directors 24. For example, it may be structured as a linear array of a given size, e.g., 1 GB. An application accesses GM by invoking the API as necessary. The API generally supports standard operations such "write", "read", etc. Thus an application writes to section of GM by invoking the API with a "write" command which will include the data to be written and an address specifying the section of GM where the data is to be written. A read command is analogous, returning GM data at a specified address to the application. The GM functions include mirroring all writes to the other director 24 of the engine 20, using the CMI 26. The programmer is responsible for coherency of GM data across the directors 24 of the system. Also, GM lacks the mapping flexibility of virtual memory. Specifically, a given size of GM must be supported by the same size of underlying physical memory, a requirement that is not present in GVM.

While various embodiments of the invention have been particularly shown and described, it will be understood by those skilled in the art that various changes in form and details may be made therein without departing from the spirit and scope of the invention as defined by the appended claims.

What is claimed is:

1. A data storage system, comprising:
    a plurality of compute engines each including a CPU complex, physical memory, front-end interfaces to host computers as initiators of storage I/O operations, back-end interfaces to physical storage devices, and a fabric interface; and
    a non-cache-coherent fabric interconnect connected to the respective fabric interfaces of the compute engines to functionally interconnect the compute engines as cluster members of a cluster, the fabric interconnect supporting a global lock enabling each of the cluster members to obtain temporary exclusive access to addressable units of non-virtual memory, at least one cluster member having access to persistent storage for memory page swapping,
    wherein the CPU complexes collectively implement a global virtual memory on top of the non-virtual memory, including (1) a globally shared GVM page table of global page table entries, each identifying the cluster members having a corresponding virtual page mapped, and (2) GVM page management functionality including (i) use of the global lock to obtain exclusive access to the global page table entries for page management operations, and (ii) transfer of underlying data of the pages of the global virtual memory among the cluster members.

2. The data storage system of claim 1, wherein the CPU complexes further collectively implement (3) additional page fault handling mechanisms for GVM addresses using the globally shared GVM page table and GVM page management functionality to provide a shared globally visible address space across compute engines utilizing the fabric interconnect.

3. The data storage system of claim 1, wherein the fabric interconnect supports the transfer of underlying data of the pages of the global virtual memory among the cluster members using remote direct memory access.

4. The data storage system of claim 1, wherein each compute engine includes redundant directors having respective CPU complexes and GVM memories interconnected by a local common memory interconnect.

5. The data storage system of claim 4, wherein the content of the GVMs is mirrored between respective pairs of compute engines.

6. The data storage system of claim 1, wherein the compute engines are configured and operative to use the global virtual memory to store device metadata visible to multiple compute engines, the device metadata describing logical storage devices defined in the system, both host-visible and internal-only, the metadata being read more frequently than the metadata is modified.

7. The data storage system of claim 1, wherein each of the global page table entries includes a lock field, a writer field, a readers field, a mirror field, a dirty field, and a statistics field, the lock field identifying a compute engine currently holding a lock on a respective GVM page of the global virtual memory, the writer field identifying a current engine allowed to modify the GVM page, the readers field identifying all engines having read copies of the GVM page, the mirror field identifying a mirror status of the GVM page, the dirty field identifying whether the GVM page is modified and not yet written to a backing store, and the statistics field including statistics on use of the GVM page.

8. The data storage system of claim 1, wherein the non-virtual memory stores the global page table entries and is realized as emulated shared memory by use of a respective function library and application programming interface (API) in each of the CPU complexes, the API including a write command enabling an application program to write data to a specified section of the non-virtual memory, and a read command returning data stored at a specified address of the non-virtual memory.

9. The data storage system of claim 8, wherein each compute engine includes redundant directors having respective CPU complexes, and a write command performed in a CPU complex of one director is automatically mirrored to the other director of the compute engine.

10. The data storage system of claim 8, wherein the application program is responsible for maintaining coherency of data of the non-virtual memory across the directors of the system.

11. A method of operating a data storage system having a plurality of compute engines and a non-cache-coherent fabric interconnect, the compute engines each including a CPU complex, physical memory, front-end interfaces to host computers as initiators of storage I/O operations, back-end interfaces to physical storage devices, and a fabric interface, and the non-cache-coherent fabric interconnect being connected to the respective fabric interfaces of the compute engines to functionally interconnect the compute engines as cluster members of a cluster, the fabric interconnect supporting a global lock enabling each of the cluster members to obtain temporary exclusive access to addressable units of non-virtual memory, at least one cluster member having access to persistent storage for memory page swapping, the method including:
    collectively implementing, by the CPU complexes, a global virtual memory on top of the non-virtual memory, the global virtual memory including a globally shared GVM page table of global page table entries, each identifying the cluster members having a corresponding virtual page mapped; and
    providing GVM page management functionality including (i) use of the global lock to obtain exclusive access to the global page table entries for page management operations, and (ii) transfer of underlying data of the pages of the global virtual memory among the cluster members.

12. The method of claim 11, further including, by the CPU complexes, further collectively implementing (3) additional page fault handling mechanisms for GVM addresses using the globally shared GVM page table and GVM page management functionality to provide a shared globally visible address space across compute engines utilizing the fabric interconnect.

13. The method of claim 11, further including, for the transfer of underlying data of the pages of the global virtual memory among the cluster members, using remote direct memory access.

14. The method of claim 11, wherein each compute engine includes redundant directors having respective CPU complexes and GVM memories interconnected by a local common memory interconnect.

15. The method of claim 14, further including mirroring the content of the GVMs between respective pairs of compute engines.

16. The method of claim 11, further including, by the compute engines, using the global virtual memory to store device metadata visible to multiple compute engines, the device metadata describing logical storage devices defined in the system, both host-visible and internal-only, the metadata being read more frequently than the metadata is modified.

17. The method of claim 11, wherein each of the global page table entries includes a lock field, a writer field, a readers field, a mirror field, a dirty field, and a statistics field, the lock field identifying a compute engine currently holding a lock on a respective GVM page of the global virtual memory, the writer field identifying a current engine allowed to modify the GVM page, the readers field identifying all engines having read copies of the GVM page, the mirror field identifying a mirror status of the GVM page, the dirty field identifying whether the GVM page is modified and not yet written to a backing store, and the statistics field including statistics on use of the GVM page.

* * * * *